United States Patent
Suzuki

(10) Patent No.: US 7,656,618 B2
(45) Date of Patent: Feb. 2, 2010

(54) DISK DEVICE AND MANUFACTURING METHOD THEREFOR

(75) Inventor: Akitoshi Suzuki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 541 days.

(21) Appl. No.: 11/699,459

(22) Filed: Jan. 30, 2007

(65) Prior Publication Data

US 2007/0177309 A1 Aug. 2, 2007

(30) Foreign Application Priority Data

Jan. 31, 2006 (JP) .............................. 2006-023915

(51) Int. Cl.
*G11B 5/54* (2006.01)
(52) U.S. Cl. .................................................. 360/256.4
(58) Field of Classification Search ................. 360/256, 360/256.2, 256.3, 256.4; 720/673
See application file for complete search history.

(56) References Cited

U.S. PATENT DOCUMENTS

| 6,028,746 A | 2/2000 | Matsumura | |
|---|---|---|---|
| 6,163,440 A | 12/2000 | Takahashi et al. | |
| 2003/0086210 A1* | 5/2003 | Miyajima | 360/256.4 |
| 2004/0145831 A1* | 7/2004 | Kanada et al. | 360/256.4 |
| 2006/0215328 A1* | 9/2006 | Kato et al. | 360/256.4 |

FOREIGN PATENT DOCUMENTS

| JP | 05-151737 | 6/1993 |
|---|---|---|
| JP | 2003-051165 | 2/2003 |

* cited by examiner

*Primary Examiner*—Allen T Cao
(74) *Attorney, Agent, or Firm*—Pillsbury Winthrop Shaw Pittman, LLP

(57) ABSTRACT

According to one embodiment, a disk device includes a case having a bottom wall, a disk-shaped recording medium located in the case, a drive motor which is located in the case and supports and rotates the recording medium, a head which performs information processing for the recording medium, a head actuator, and an inertial latch mechanism which latches and holds the head actuator in a retracted position when an external force is subjected. The inertial latch mechanism is modularized and includes a base plate, a first pivot and a second pivot set up on the base plate, a latch arm supported for rocking motion around the first pivot, an inertial arm which is rockably supported on the second pivot, and a stopper portion which prevents the latch arm and the inertial arm from slipping off the first and second pivots.

7 Claims, 5 Drawing Sheets

DISK DEVICE AND MANUFACTURING METHOD THEREFOR

CROSS-REFERENCE TO RELATED APPLICATIONS

This application is based upon and claims the benefit of priority from Japanese Patent Application No. 2006-023915, filed Jan. 31, 2006, the entire contents of which are incorporated herein by reference.

BACKGROUND

1. Field

An embodiment of the invention relates to a disk device provided with an inertial latch mechanism for a head actuator and a manufacturing method for the disk device.

2. Description of the Related Art

In recent years, magnetic disk devices, for example, have been widely used as large-capacity disk devices for electronic apparatuses such as personal computers. In general, a magnetic disk device comprises a magnetic disk, spindle motor, head actuator, voice coil motor (VCM), board unit, etc., which are located in a case. The spindle motor supports and rotates the magnetic disk. The head actuator supports a magnetic head. The VCM, which serves to drive the head actuator, includes a voice coil attached to the head actuator, a pair of yokes mounted on the case side, and a permanent magnet.

Further, small-sized portable personal computers have recently been spreading, and magnetic disk devices that are mounted on the personal computers of this type are expected to be improved in reliability against a shock or the like that may be produced while the computer is being carried about.

Thereupon, a magnetic disk device is proposed that comprises a ramp load mechanism as a mechanism for holding the magnetic head in a predetermined position when the device is non-operating. This ramp load mechanism is provided with a ramp that is located outside the magnetic disk. When the disk device is non-operating, the head actuator is rocked to a retracted position beside the outer periphery of the disk, whereupon a suspension runs onto the ramp. Thus, the magnetic head is held in the retracted position off a surface of the magnetic disk, so that it can be prevented from colliding with the disk when subjected to a shock.

Furthermore, one such magnetic disk device is proposed having an inertial latch mechanism that enhances its shock resistance. If a shock acts on the magnetic disk device in a non-operating state, the inertial latch mechanism engages the head actuator to restrict its rocking motion, thereby holding the head actuator in the retracted position.

As disclosed in Jpn. Pat. Appln. KOKAI Publication No. 2003-51165, for example, the inertial latch mechanism has an inertial arm and a latch arm. The inertial arm is rotated in both forward and reverse directions by external shock acceleration. The latch arm is urged to rotate in one direction as the inertial arm rotates. If a shock is produced in the non-operating state, the latch arm engages the head actuator, thereby holding the head actuator in the retracted position.

In the inertial latch mechanism constructed in this manner, the inertial arm and the latch arm are supported individually by pivots for rotation that are set up on a bottom wall of the case. With the recent miniaturization of magnetic disk devices, the case has been reduced in size and thickness. It is difficult to set up the pivots on the thin bottom wall.

As the magnetic disk devices have thus been reduced in size, the inertial arm and the latch arm of the inertial latch mechanism have become very small components. In assembling the magnetic disk devices, it is very troublesome to mount those small components on the pivots that are set up on the case in which various parts are incorporated, so that the working efficiency is low.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
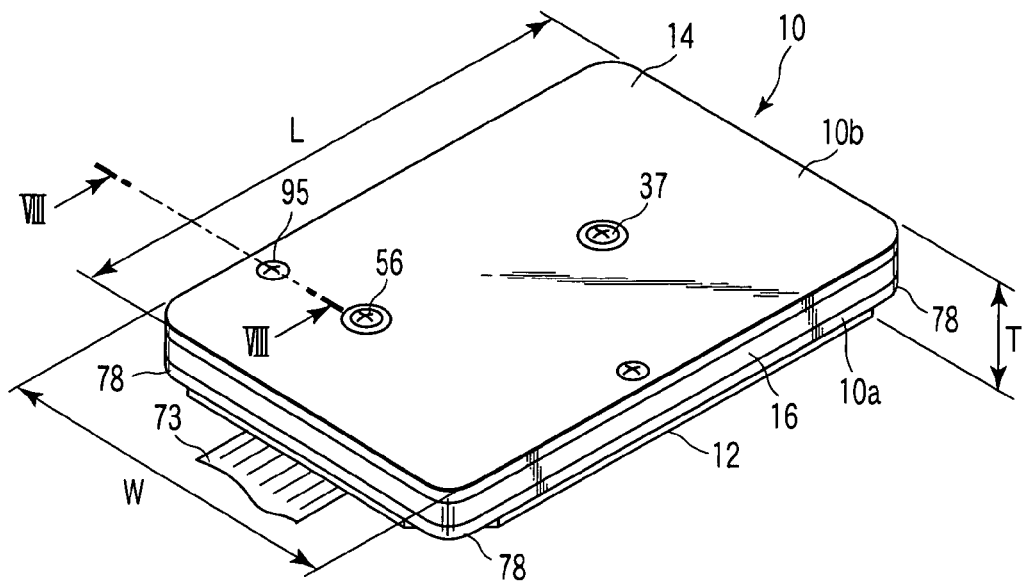
FIG. 1 is an exemplary perspective view showing an HDD according to a first embodiment of the invention.

Various embodiments according to the invention will be described hereinafter with reference to the accompanying drawings. In general, according to one embodiment of the invention, a disk device comprises a case having a bottom wall; a disk-shaped recording medium located in the case; a drive motor which is located in the case and supports and rotates the recording medium; a head which performs information processing for the recording medium; a head actuator which is provided on the bottom wall in the case, supports the head for movement with respect to the recording medium, and is movable between a predetermined retracted position in which the head is situated on the outer peripheral side of the recording medium and an information processing position in which the head is situated over the recording medium; and an inertial latch mechanism which latches and holds the head actuator in the retracted position when the actuator moving to the retracted position is subjected to an external force, the inertial latch mechanism being modularized and including: a base plate; a first pivot and a second pivot set up on the base plate; a latch arm supported for rocking motion around the first pivot between a latch position in which the latch arm latches the head actuator in the retracted position and a release position in which the latch arm leaves the head actuator so that the head actuator is unlatched; an inertial arm which is rockably supported on the second pivot, rocks around the second pivot when subjected to an external force and causes the latch arm to rock from the release position to the latch position, and a stopper portion which prevents the latch arm and the inertial arm from slipping off the first and second pivots.

According to another embodiment, a method of manufacturing a disk device which comprises a case having a bottom wall, a disk-shaped recording medium located in the case, a drive motor which is located in the case and supports and rotates the recording medium, a head which performs information processing for the recording medium, a head actuator which is provided on the bottom wall in the case, supports the head for movement with respect to the recording medium, and is movable between a predetermined retracted position in which the head is situated on the outer peripheral side of the recording medium and an information processing position in which the head is situated over the recording medium, and an inertial latch mechanism which latches and holds the head actuator in the retracted position when the actuator moving to the retracted position is subjected to an external force, the method comprises: rotatably mounting a latch arm and an inertial arm, respectively, on a first pivot and a second pivot set up on a base plate of the inertial latch mechanism and restricting disengagement of the latch arm and the inertial arm by means of a stopper portion, thereby forming the inertial latch mechanism in a modularized form; mounting the modularized inertial latch mechanism and the drive motor on the bottom wall of the case; and setting the recording medium on the drive motor and mounting the head actuator on the bottom wall of the case.

A hard disk drive (hereinafter referred to as an HDD) according to a first embodiment of this invention will now be described in detail with reference to the accompanying drawings.

Figure 2:
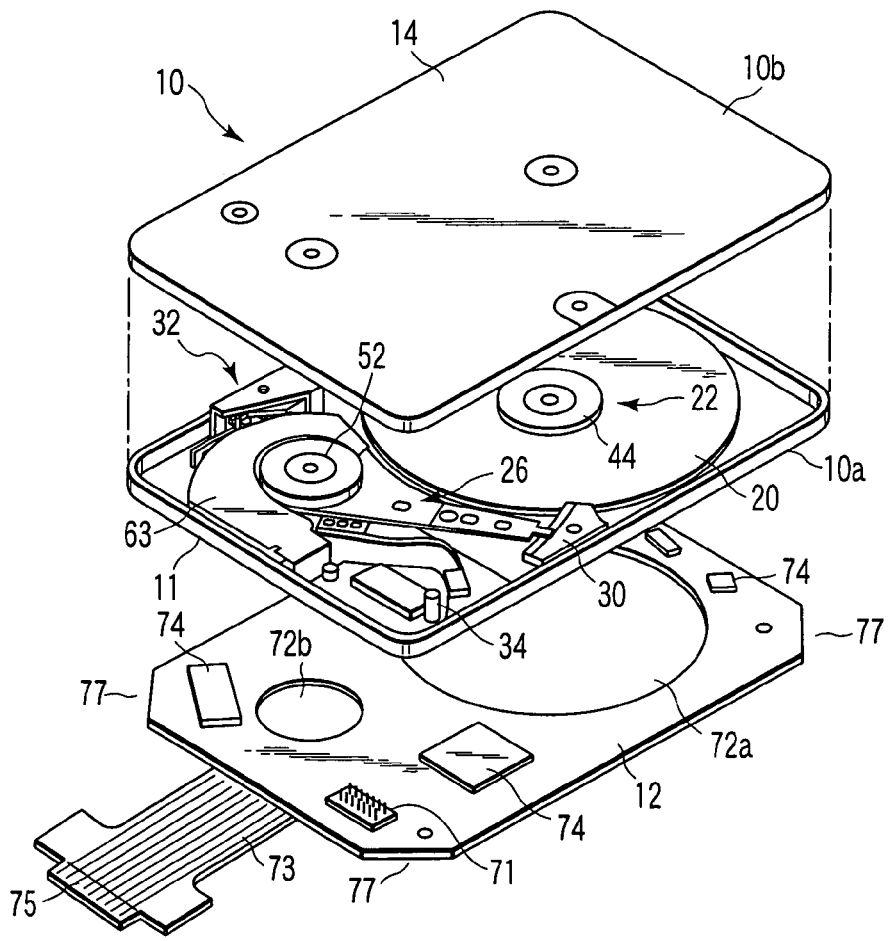
FIG. 2 is an exemplary exploded perspective view of the HDD.

As shown in FIGS. 1 and 2, the HDD comprises a case 10 substantially in the form of a rectangular box that contains various members (mentioned later) and a rectangular control circuit board 12 lapped on the outer surface of the case 10. The case 10 and the circuit board 12 each have a length L of 32 mm and a width W of 24 mm, for example, and a thickness T including the case and the circuit board ranges from 3 to 6 mm. The thickness T is adjusted to, for example, 3.3 or 5 mm, depending on the number of stored disks.

Figure 3:
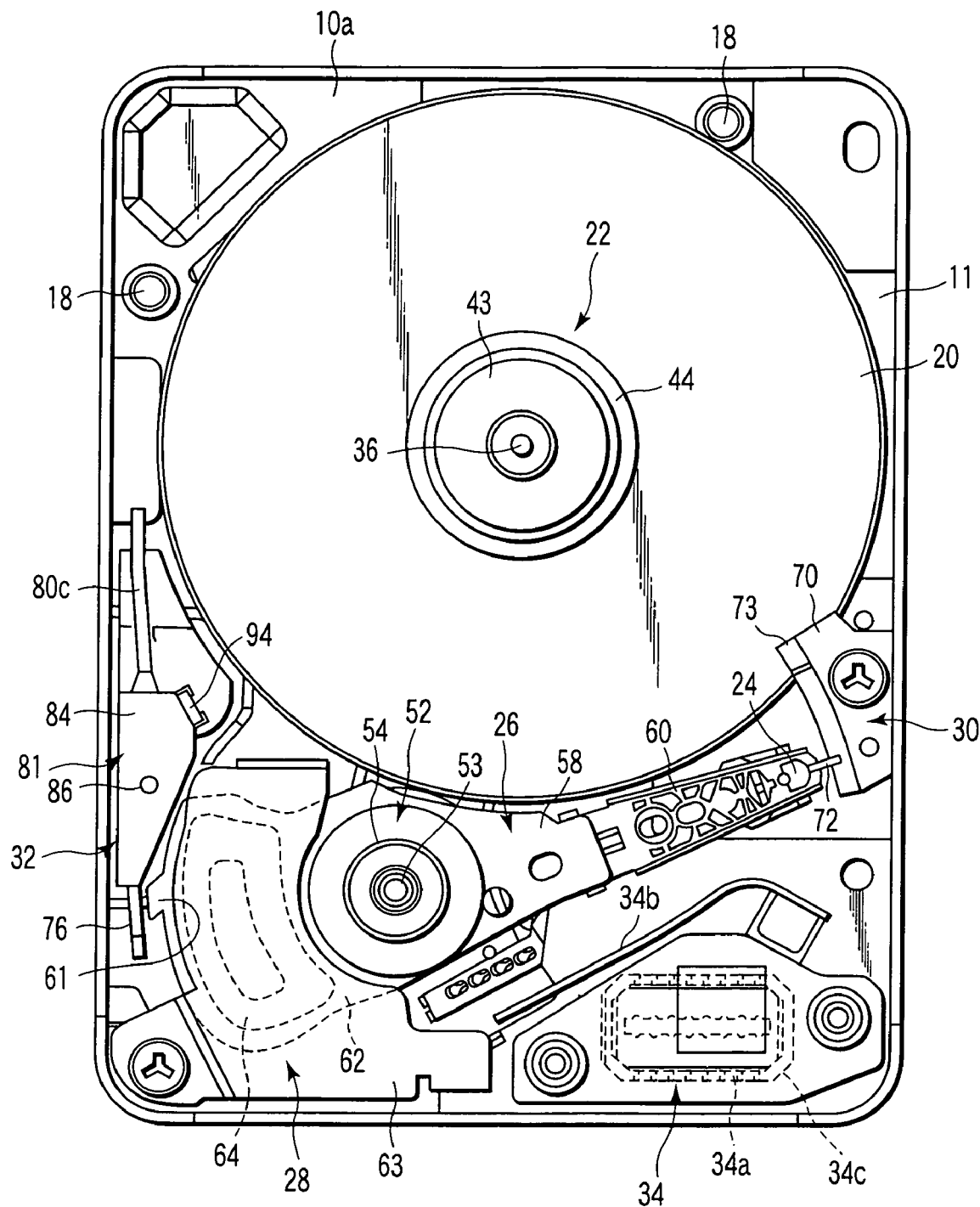
FIG. 3 is an exemplary plan view showing a case and an internal structure of the HDD.

As shown in FIGS. 1 to 3, the case 10 includes a first shell 10a and a second shell 10b that are substantially equal in size. Each of the first and second shells 10a and 10b is a substantially rectangular structure formed by pressing a metal plate and has side walls set up on its peripheral edge portion. The first and second shells 10a and 10b are located opposite each other so that their respective peripheral edge portions face each other. A belt-shaped seal 16 is wound around the peripheral edge portions of the shells 10a and 10b, thereby connecting them and sealing a gap between them. Thus, the case 10 is constructed in the form of a rectangular box having a rectangular bottom wall 11, an upper wall 14, and four side walls that are set up on the periphery of the bottom wall.

The bottom wall 11 of the first shell 10a forms a rectangular outer surface. The four corners of the case 10 that include the corners of the bottom wall are rounded in a circular arc each. Thus, the seal 16 that is wound around the peripheral edge portion of the case 10 is prevented from being damaged by the corners of the case and from loosening and impairing the airtightness.

As shown in FIGS. 1 and 2, the control circuit board 12, which is formed of a printed circuit board, is a rectangular structure that is substantially equal to the bottom wall 11 of the case 10 in length and width. The bottom wall 11 is formed with circular protrusions (not shown) corresponding a spindle motor 22 and a bearing assembly 52, individually. The control circuit board 12 is formed with circular openings 72a and 72b corresponding to those protrusions, individually. The four corner portions of the circuit board 12 are cut diagonally, e.g., at 45 degrees to each side, and form cut portions 77, individually.

Electronic components 74 and a connector 71 are mounted on the inner surface of the control circuit board 12 that faces the case 10. A flexible printed circuit board 73 that electrically connects the HDD to an external device is connected to the control circuit board 12 and led out through a short side of the control circuit board. Connection terminals 75 are arranged on an extended end of the printed circuit board 73.

The control circuit board 12 is lapped on the bottom wall 11 of the case 10 and fastened to the first shell 10a by screws. As this is done, the circuit board 12 is located in a manner such that its four sides are aligned or coincident with the four sides of the bottom wall 11, individually. The protrusions that are formed on the bottom wall 11 are located individually in the openings 72a and 72b of the control circuit board 12. The connector 71 mounted on the circuit board 12 is connected to a connector 34c of a board unit 34, which will be mentioned later.

The cut portions 77 at the four corners of the control circuit board 12 are situated individually corresponding to the four corner portions of the bottom wall 11. Thus, the four corner portions of the bottom wall 11 are exposed to the outside without being covered by the circuit board 12. The corners of the case 10 that include the four exposed corner portions of the bottom wall 11 individually constitute retaining portions 78 for holding the case without touching the circuit board 12.

As shown in FIGS. 2 and 3, the case 10 contains a magnetic disk 20 about, e.g., 0.85 inches in diameter, spindle motor 22, magnetic head 24, carriage 26, voice coil motor (VCM) 28, ramp load mechanism 30, inertial latch mechanism 32, board unit 34, etc. The magnetic disk 20 functions as an information recording medium. The spindle motor 22 serves as a drive motor that supports and rotates the disk. The magnetic head 24 writes and reads information to and from the disk. The carriage 26 supports the magnetic head for movement with respect to the disk 20. The VCM 28 rocks and positions the carriage. The ramp load mechanism 30 unloads into and holds the magnetic head in a position at a distance from the magnetic disk when the head is moved to the peripheral edge portion of the disk. The inertial latch mechanism 32 holds the carriage in a retracted position when a shock is applied. The board unit 34 has a head IC and the like.

The spindle motor 22 is mounted on the first shell 10a. The motor 22 has a pivot 36, which is fixed to and set substantially upright on the inner surface of the bottom wall 11 of the first shell 10a. An extended end of the pivot 36 is fastened to the second shell 10b by a fixing screw 37 that is externally threaded into the second shell. Thus, the pivot 36 is doubly supported by the first and second shells 10a and 10b.

A rotor is rotatably supported on the pivot 36 by a bearing (not shown). An end portion of the rotor on the side of the second shell 10b forms a circular columnar hub 43, and the magnetic disk 20 is coaxially fitted on the hub. An annular clamp ring 44 is fitted on an end portion of the hub 43 and holds the inner circumferential edge portion of the disk 20. Thus, the magnetic disk 20 is fixed to the rotor and supported for integral rotation with the rotor.

An annular permanent magnet (not shown) is fixed to an end portion of the rotor on the side of the first shell 10a and situated coaxially with the rotor. The spindle motor 22 has a stator core attached to the first shell 10a and coils wound around the stator core. The stator core and the coils are arranged with a gap therebetween outside the permanent magnet.

The carriage 26 that constitutes a head actuator is provided with a bearing assembly 52 that is fixed on the inner surface of the bottom wall of the first shell 10a. The bearing assembly 52 has a pivot 53 set upright on the inner surface of the first shell 10a and a circular cylindrical hub 54 that is rotatably supported on the pivot 53 by a pair of bearings. An extended end of the pivot 53 is fastened to the second shell 10b by a fixing screw 56 that is externally threaded into the second shell. Thus, the pivot 53 is doubly supported by the first and second shells 10a and 10b. The bearing assembly 52 that serves as a bearing portion is located side by side with the spindle motor 22 in the longitudinal direction of the case 10.

As shown in FIG. 3, the carriage 26 comprises an arm 58 extending from the hub 54, a suspension 60 in the form of an elongate plate extending from the distal end of the arm, and a support frame 62 extending from the hub 54 in the direction opposite from the arm. The carriage 26 is provided with an engaging projection 61 that protrudes outward from the support frame 62, that is, radially with respect to the bearing assembly 52.

The magnetic head 24 is supported on an extended end of the suspension 60 by a gimbals portion (not shown). The head 24 is subjected to a predetermined head load that is directed toward a surface of the magnetic disk 20 by the spring force of the suspension 60. A voice coil 64 that constitutes the VCM 28 is integrally fixed to the support frame 62.

Figure 8:
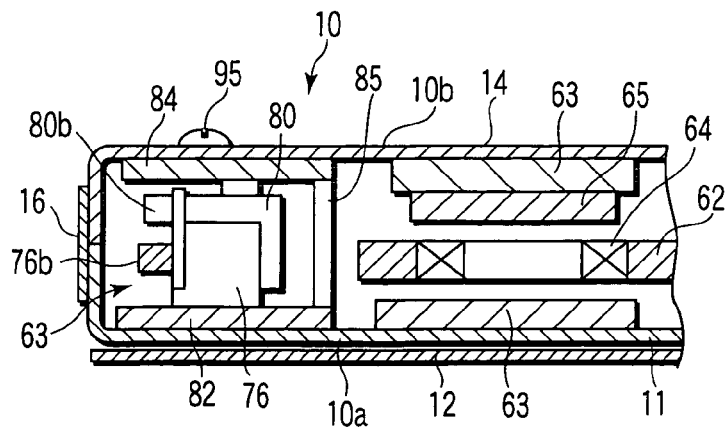
FIG. 8 is an exemplary sectional view of the HDD taken along line VIII-VIII of FIG. 1.

As shown in FIGS. 3 and 8, the VCM 28, which can rock the carriage 26 around the bearing assembly 52, comprises a pair of yokes 63 and a magnet 65. The yokes 63 are fixed on the first shell 10a and opposed to each other with a gap between them. The magnet 65 is fixed to the inner surface of one of the yokes and opposed to the voice coil 64. When the carriage 26 is incorporated in the first shell 10a, the voice coil 64 is situated between the one of the yokes 63 and the magnet 65. If the coil 64 is energized, the carriage 26 rocks between the retracted position shown in FIG. 3 and an information processing position in which the magnetic head 24 is situated over the surface of the magnetic disk 20. Thereupon, the head 24 is positioned over a desired track of the disk 20.

As shown in FIG. 3, the ramp load mechanism 30 comprises a ramp member 70 and a tab 72. The ramp member 70 is fixed to the bottom wall of the inner surface of the first shell 10a and opposed to the peripheral edge portion of the magnetic disk 20. The tab 72 extends from the distal end of the suspension 60 and serves as an engaging member. The ramp member 70 is formed by bending a plate material and has a ramp surface 73 that can be engaged with the tab 72. When the carriage 26 rocks from the inner peripheral portion of the magnetic disk 20 to the retracted position beside the outer periphery of the disk, the tab 72 engages the ramp surface 73 of the ramp member 70. Thereafter, the tab 72 is pulled up along a slope of the ramp surface, whereupon the magnetic head 24 is unloaded. When the carriage 26 rocks to the retracted position, the tab 72 is supported on the ramp surface 73 of the ramp member 70, and the magnetic head 24 is kept apart from the surface of the magnetic disk 20.

The board unit 34 has a body 34a formed of a flexible printed circuit board. The body 34a is fixed to the inner surface of a bottom wall of the first shell 10a. Electronic components, such as a head IC, head amplifier, etc., are mounted on the body 34a. The board unit 34 has a main flexible printed circuit board (main FPC) 34b that extends from the body 34a. An extended end of the main FPC 34b is connected to a portion near the bearing assembly 52 of the carriage 26 and further electrically connected to the magnetic head 24 by a cable (not shown) that is provided on the arm 58 and the suspension 60. The connector 34c for connection with the control circuit board 12 is mounted on the bottom surface of the body of the board unit 34. The connector 34c is exposed on the bottom wall 11 of the first shell 10a through an opening in the bottom wall of the first shell and connected to the connector 71 of the circuit board 12.

As shown in FIGS. 2 and 3, the inertial latch mechanism 32 is provided on the bottom wall 11 of the first shell 10a and latches the carriage 26 that is moved to the retracted position, thereby preventing the carriage 26 from moving from the retracted position to the information processing position, if the HDD is subjected to any external force such as a shock.

Figure 4:
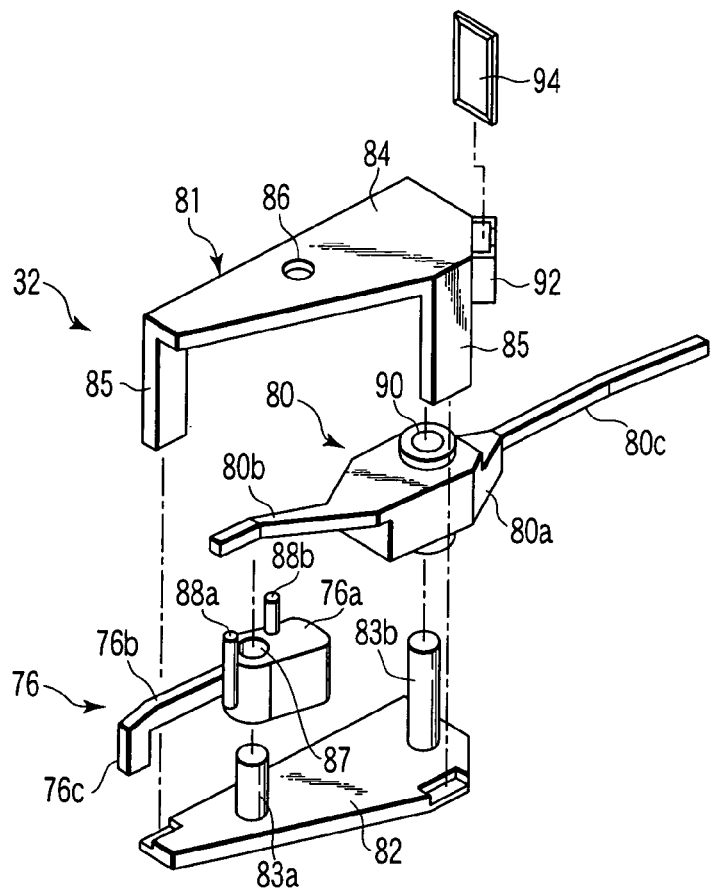
FIG. 4 is an exemplary exploded perspective view showing an inertial latch mechanism of the HDD.
Figure 5:
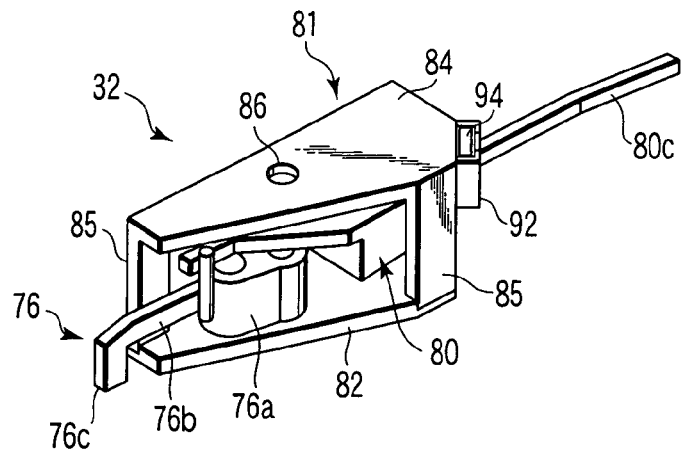
FIG. 5 is an exemplary perspective view showing the inertial latch mechanism.

As shown in FIGS. 4 and 5, the inertial latch mechanism 32 has a latch arm 76, an inertial arm 80, and a retaining frame 81 that supports these arms for rotation, and is modularized as one unit. The retaining frame 81 has a base plate 82, a first pivot 83a and a second pivot 83b set substantially upright on the base plate, and a top plate 84 opposed to the base plate with the first and second pivots between them. The top plate 84 integrally has a pair of leg portions 85, the respective extended ends of which are fixed to the base plate 82. A threaded hole 86 is formed substantially in the central part of the top plate 84. The retaining frame 81 is formed of a metal or synthetic resin.

The latch arm 76 integrally has a body 76a and an arm portion 76b extending from the body. The latch arm 76 is rockably supported around the first pivot 83a in a manner such that the first pivot is passed through a through hole 87 in the body 76a. A latch claw 76c is formed on an extended end of the arm portion 76b. It can engage the engaging projection 61 on the support frame 62 of the carriage 26. A first engaging pin 88a and a second engaging pin 88b protrude from the body 76a, extend parallel to the first pivot 83a, and are situated individually on the opposite sides of the through hole 87. The latch arm 76 is formed of a metal or synthetic resin.

The inertial arm 80 integrally has a body 80a, a first arm portion 80b extending in one direction from the body, and a second arm portion 80c extending from the body in the opposite direction with respect to the first arm portion. The inertial arm 80 is rockably supported around the second pivot 83b in a manner such that the second pivot is passed through a through hole 90 in the body 80a.

The first arm portion 80b extends at right angles to the second pivot 83b and between the first engaging pin 88a and the second engaging pin 88b of the latch arm 76. The first arm portion 80b engages the first engaging pin 88a and the second engaging pin 88b. The second arm portion 80c extends outward beyond the retaining frame 81. The inertial arm 80 is formed of a metal or synthetic resin.

The top plate 84 of the retaining frame 81 is situated opposite the inertial arm 80 and prevents the inertial arm from slipping off the second pivot 83b. Thus, the top plate 84 constitutes a stopper portion. Further, a holder 92 is formed integrally on the outer surface of the retaining frame 81, and a circulation filter 94 is held by the holder 92.

In the case 10, as shown in FIGS. 2, 3, 6, 7 and 8, the inertial latch mechanism 32 that is modularized in the aforesaid manner is provided near the support frame 62 of the carriage 26. Further, the base plate 82 of the retaining frame 81 is kept fixed to the inner surface of the bottom wall of the first shell 10a when the inertial latch mechanism 32 is located in the case 10. The base plate 82 is fixed to the bottom wall 11 by adhesive bonding or screwing. The circulation filter 94 is located near the outer periphery of the magnetic disk 20 or in a position where it is hit by an airflow caused by the rotation of the disk. Thus, the filter 94 can capture dust in the case 10.

As shown in FIG. 8, the top plate 84 of the retaining frame 81 is in contact with the inner surface of the upper wall 14 of the second shell 10b and is fastened to the upper wall by a screw 95 that is externally threaded into the wall. Thus, the retaining frame 81 serves also as a support member that supports the bottom wall 11 and the upper wall 14 of the case 10.

Figure 7:
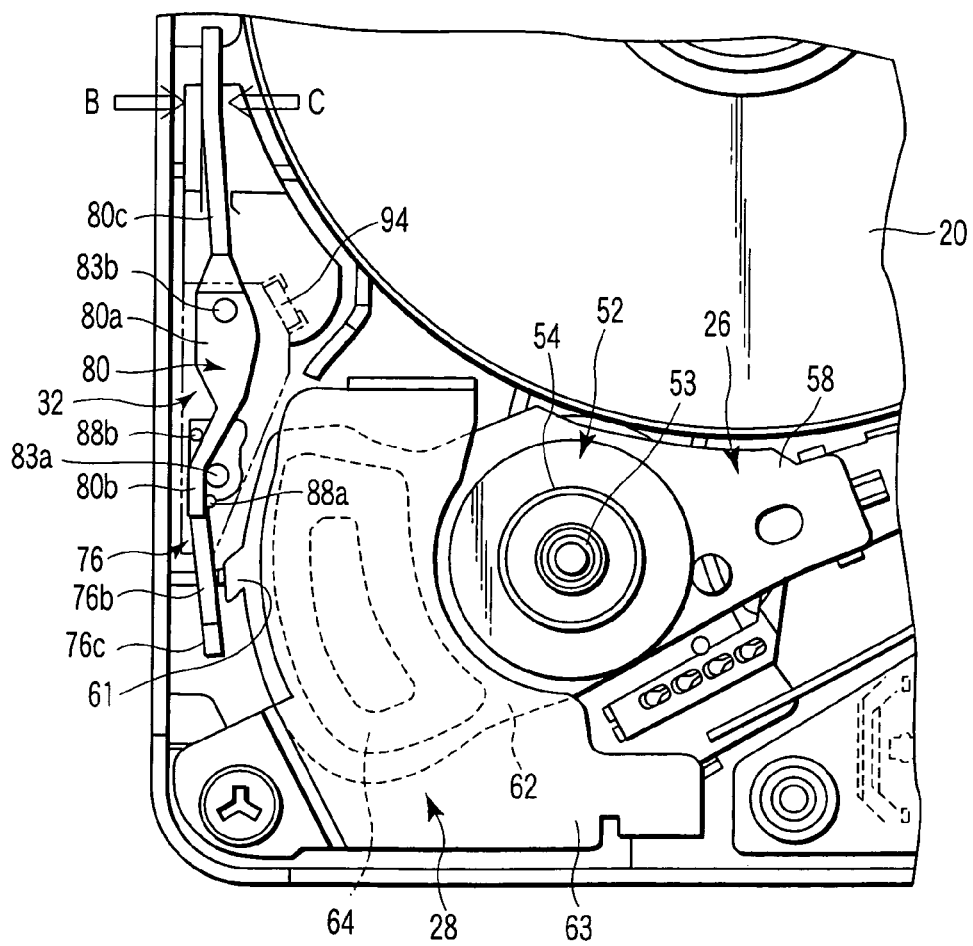
FIG. 7 is an exemplary plan view showing a head actuator, a VCM, and the inertial latch mechanism of the HDD.

When the HDD is normally operating, the latch arm 76 of the inertial latch mechanism 32 is in its release position, as shown in FIG. 7. In the release position, the latch claw 76c of the latch arm 76 is kept apart from the engaging projection 61 of the carriage 26 and allows the carriage 26 to rock.

If any external force, e.g., an external force in the direction of arrow B, acts on the HDD with the carriage 26 in the retracted position, the inertial arm 80 rocks clockwise around the second pivot 83b. Thereupon, the first arm portion 80b of the inertial arm 80 presses the second engaging pin 88b of the latch arm 76, thereby rocking the latch arm counterclockwise around the first pivot 83a. Thereupon, the latch arm 76 moves to its latch position, where it engages the engaging projection 61 of the carriage 26 to latch the carriage. Thus, the carriage 26 is restricted from rocking motion by the latch claw and held in the retracted position.

If any external force, e.g., an external force in the direction of arrow C, acts on the HDD with the carriage 26 in the retracted position, the inertial arm 80 rocks counterclockwise around the second pivot 83b. Thereupon, the first arm portion 80b of the inertial arm 80 presses the first engaging pin 88a of the latch arm 76, thereby rocking the latch arm counterclockwise around the first pivot 83a. Thereupon, the latch arm 76 moves to its latch position, where it engages the engaging projection 61 of the carriage 26 to latch the carriage. Thus, the carriage 26 is restricted from rocking motion by the latch claw and held in the retracted position.

Even if an external force such as a shock acts on the HDD, as described above, the inertial latch mechanism 32 restricts the carriage 26 from moving unexpectedly, thereby preventing a failure such that the magnetic head runs against the magnetic disk 20 to damage it.

In manufacturing the HDD constructed in this manner, the first and second shells 10a and 10b are first formed by, for example, press molding. Subsequently, the inertial latch mechanism 32 is assembled. In this case, the latch arm 76 and the inertial arm 80 are successively mounted on the first and second pivots 83a and 83b that are set up on the base plate 82. Thereafter, the top plate 84 is lapped on the latch arm 76 and the inertial arm 80, and its leg portions 85 are adhesively bonded to the base plate 82. Further, the circulation filter 94 is attached to the holder 92 of the retaining frame 81. Thus, the inertial latch mechanism 32 is obtained as a modularized unit.

The inertial latch mechanism 32 may be assembled beforehand in any other place. The circulation filter 94 may be mounted after the inertial latch mechanism 32 is incorporated into the case 10.

Figure 6:
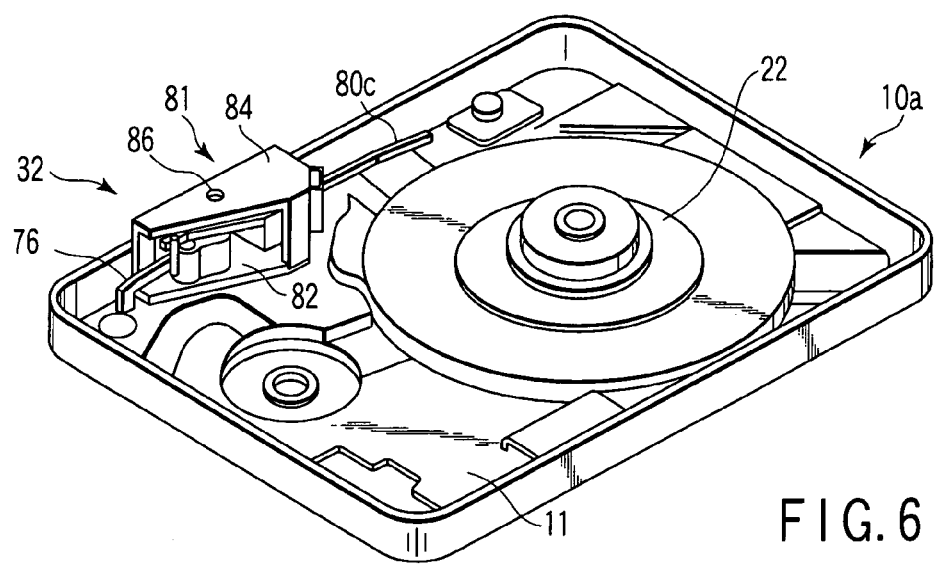
FIG. 6 is an exemplary perspective view showing one shell of the HDD and the inertial latch mechanism therein.

Then, the spindle motor 22 and the inertial latch mechanism 32 are mounted on the bottom wall 11 of the first shell 10a, as shown in FIG. 6. In doing this, the base plate 82 of the inertial latch mechanism 32 is adhesively bonded to the inner surface of the bottom wall 11 of the base plate 82.

Thereafter, the magnetic disk 20 is mounted on the spindle motor 22, and the VCM 28, carriage 26, board unit 34, and ramp load mechanism 30 are successively loaded onto the bottom wall 11 of the first shell 10a. Then, the second shell 10b is put on the first shell 10a and fastened to the pivot 36 of the spindle motor 22, the pivot 53 of the bearing assembly 52, and the top plate 84 of the inertial latch mechanism 32 with the screws 37, 56 and 95, respectively. Further, the seal 16 is wound around the formed case 10, thereby sealing the gap between the first and second shells 10a and 10b.

Subsequently, the control circuit board 12 is screwed to the outer surface side of the bottom wall 11 of the case 10 and electrically connected to the board unit 34 in the case 10. The HDD is obtained by these processes.

Since the inertial latch mechanism 32 is modularized, according to the HDD constructed in this manner, it can be handled with ease. Since the inertial latch mechanism 32 is provided with the stopper portion for the inertial arm and the latch arm, there is no possibility of the arms slipping off during assembly, so that the order of mounting of the members can be selected freely, and the shells can be screwed in an inverted posture. Thus, the assemblability and the degree of freedom of assembly of the HDD are improved. Since the inertial latch mechanism has the pivots that are set up on the base plate, any other pivots need not be set up on the wall portion of the case, so that the case can be reduced in size and wall thickness.

Further, the retaining frame 81 of the modularized inertial latch mechanism 32 can enjoy additional functions. Since the retaining frame 81 is fixed to the bottom and upper walls of the case 10 in the aforesaid manner, the retaining frame 81 can be used as a support to enhance the mechanical strength of the case 10. Since the circulation filter 94 is attached to the retaining frame 81, moreover, a parts installation space in the case can be utilized efficiently.

Accordingly, there may be obtained an HDD, capable of further miniaturization and excellent in assemblability, and a manufacturing method therefor.

Figure 9:
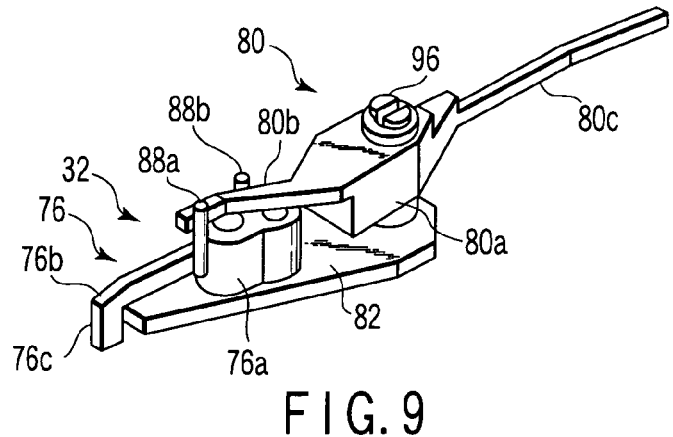
FIG. 9 is an exemplary exploded perspective view showing an inertial latch mechanism of an HDD according to a second embodiment of the invention.
Figure 10:
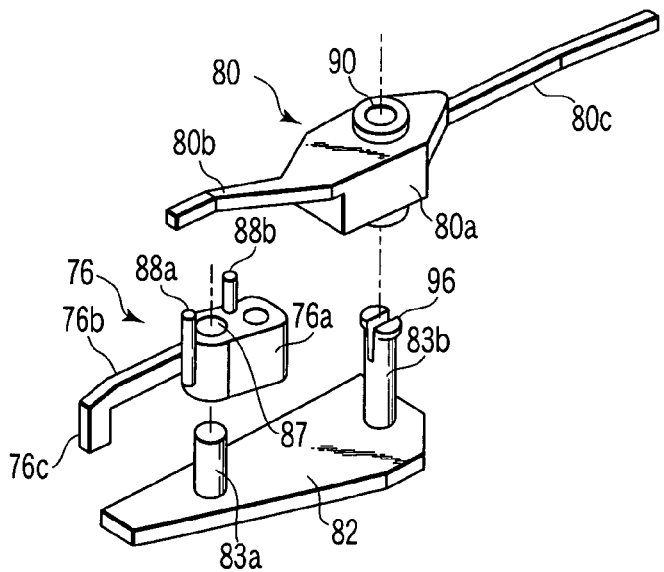
FIG. 10 is an exemplary perspective view showing the inertial latch mechanism.

The following is a description of an HDD according to a second embodiment of this invention. FIGS. 9 and 10 show an inertial latch mechanism 32 according to the second embodiment. According to this embodiment, a retaining frame is provided with a base plate 82 only, and first and second pivots 83a and 83b are set up on the base plate 82. A flange portion 96 is formed on an extended end of the second pivot 83b so as to project from its outer periphery. Further, an axially extending slit is formed in the extended end of the second pivot 83b. Thus, the flange portion 96 can be elastically deformed in a contracting direction such that its diameter is reduced.

The second pivot 83b is passed through a through hole 90 in an inertial arm 80 and supports the inertial arm for rocking motion. The flange portion 96 is passed through the through hole 90 and projects above the outer surface of the body 80a of the inertial arm 80, thereby preventing the inertial arm from slipping off the second pivot 83b. Thus, the flange portion 96 constitutes a stopper portion. In this manner, the inertial latch mechanism 32 is modularized as one unit, which is located in the case with the base plate 82 fixed to the inner surface of the bottom wall of the base plate 82.

In the second embodiment, other configurations of the inertial latch mechanism 32 and the HDD are the same as those of the foregoing first embodiment, like reference numerals are used to designate like portions of the two embodiments, and a detailed description of those portions is omitted. Also in the second embodiment arranged in this manner, the modularized inertial latch mechanism 32 is easy to handle. Since it is provided with the stopper portion for the inertial arm and a latch arm, there is no possibility of the arms slipping off during assembly, so that the order of mounting of the members can be selected freely, and the shells can be screwed in an inverted posture. Thus, the assemblability and the degree of freedom of assembly of the HDD are improved. Since the inertial latch mechanism has the pivots that are set up on the base plate, any other pivots need not be set up on the wall portion of the case, so that the case can be reduced in size and wall thickness.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

In the HDD, the magnetic disk is not limited to one in number but more magnetic disks may be used, if necessary. This invention is not limited to magnetic disk devices but may be also applied to any other disk devices, such as optical disk devices. The diameter of the magnetic disk is not limited to 0.85 inches but may be 1.8 or 2.5 inches.

What is claimed is:

1. A disk device comprising:
a case having a bottom wall;
a disk-shaped recording medium located in the case;
a drive motor which is located in the case and supports and rotates the recording medium;
a head which performs information processing for the recording medium;
a head actuator which is provided on the bottom wall in the case, supports the head for movement with respect to the recording medium, and is movable between a predetermined retracted position in which the head is situated on the outer peripheral side of the recording medium and an information processing position in which the head is situated over the recording medium; and
an inertial latch mechanism which latches and holds the head actuator in the retracted position when the actuator moving to the retracted position is subjected to an external force, the inertial latch mechanism being modularized and including: a base plate; a first pivot and a second pivot set up on the base plate; a latch arm supported for rocking motion around the first pivot between a latch position in which the latch arm latches the head actuator in the retracted position and a release position in which the latch arm leaves the head actuator so that the head actuator is unlatched; an inertial arm which is rockably supported on the second pivot, rocks around the second pivot when subjected to an external force and causes the latch arm to rock from the release position to the latch position, and a stopper portion which prevents the latch arm and the inertial arm from slipping off the first and second pivots.

2. A disk device according to claim 1, wherein the base plate of the modularized inertial latch mechanism is mounted on the bottom wall of the case.

3. A disk device according to claim 2, wherein the inertial latch mechanism includes a top plate which is opposed and fixed to the base plate with the first and second pivots therebetween and constitutes the stopper portion.

4. A disk device according to claim 3, wherein the case has an upper wall opposed to the bottom wall across a gap, and the inertial latch mechanism is located between the bottom wall and the upper wall of the case with the top plate in contact with the upper wall and supports the upper wall.

5. A disk device according to claim 3, further comprising a circulation filter which is attached to a frame of the inertial latch mechanism including the top plate and captures dust in the case.

6. A disk device according to claim 1, wherein the stopper portion has a flange portion which is formed on an extended end of the second pivot and prevents disengagement of the inertial arm.

7. A method of manufacturing a disk device which comprises a case having a bottom wall, a disk-shaped recording medium located in the case, a drive motor which is located in the case and supports and rotates the recording medium, a head which performs information processing for the recording medium, a head actuator which is provided on the bottom wall in the case, supports the head for movement with respect to the recording medium, and is movable between a predetermined retracted position in which the head is situated on the outer peripheral side of the recording medium and an information processing position in which the head is situated over the recording medium, and an inertial latch mechanism which latches and holds the head actuator in the retracted position when the actuator moving to the retracted position is subjected to an external force, the method comprising:
rotatably mounting a latch arm and an inertial arm, respectively, on a first pivot and a second pivot set up on a base plate of the inertial latch mechanism and restricting disengagement of the latch arm and the inertial arm by means of a stopper portion, thereby forming the inertial latch mechanism in a modularized form;
mounting the modularized inertial latch mechanism and the drive motor on the bottom wall of the case; and
setting the recording medium on the drive motor and mounting the head actuator on the bottom wall of the case.

* * * * *